(12) United States Patent
Jun

(10) Patent No.: US 11,942,603 B2
(45) Date of Patent: Mar. 26, 2024

(54) STACK-FOLDING TYPE ELECTRODE ASSEMBLY AND LITHIUM METAL BATTERY INCLUDING THE SAME

(71) Applicant: LG CHEM, LTD., Seoul (KR)

(72) Inventor: Youngjin Jun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 279 days.

(21) Appl. No.: 16/980,214

(22) PCT Filed: Aug. 6, 2019

(86) PCT No.: PCT/KR2019/009814
§ 371 (c)(1),
(2) Date: Sep. 11, 2020

(87) PCT Pub. No.: WO2020/036359
PCT Pub. Date: Feb. 20, 2020

(65) Prior Publication Data
US 2021/0020993 A1     Jan. 21, 2021

(30) Foreign Application Priority Data

Aug. 13, 2018  (KR) .................. 10-2018-0094526
Aug. 2, 2019   (KR) .................. 10-2019-0094560

(51) Int. Cl.
*H01M 50/463*    (2021.01)
*H01M 4/134*     (2010.01)
(Continued)

(52) U.S. Cl.
CPC ....... *H01M 10/0583* (2013.01); *H01M 4/134* (2013.01); *H01M 4/382* (2013.01);
(Continued)

(58) Field of Classification Search
CPC .......... H01M 4/38; H01M 4/134; H01M 4/64; H01M 10/0583; H01M 10/052
See application file for complete search history.

(56) References Cited

U.S. PATENT DOCUMENTS 7,781,093 B2    8/2010 Jeung et al.
2006/0269835 A1  11/2006 Song
(Continued)

FOREIGN PATENT DOCUMENTS

CN         104466221 A        3/2015
DE    10 2016 218 496 A1     3/2018
(Continued)

OTHER PUBLICATIONS

Machine Translation of: KR 10-2016-0095354, Kim et al., Aug. 11, 2016.*
(Continued)

*Primary Examiner* — Kenneth J Douyette
(74) *Attorney, Agent, or Firm* — Morgan, Lewis & Bockius LLP

(57) ABSTRACT

The present invention relates to a stack-folding type of electrode assembly and a lithium metal battery including the same.
In detail, according to an exemplary embodiment of the present invention, the lithium metal battery is realized as a stack-folding type, and the insulation tape is respectively attached to the upper side and the lower side of the folding separation film, thereby solving the drawback of exposure of the lithium dendrite and the dead lithium produced on the surface of the negative electrode during the charging and discharging process.

17 Claims, 7 Drawing Sheets

(51) Int. Cl.
  *H01M 4/38*   (2006.01)
  *H01M 4/64*   (2006.01)
  *H01M 10/052*  (2010.01)
  *H01M 10/0583* (2010.01)
  *H01M 50/105*  (2021.01)
  *H01M 50/46*   (2021.01)
  *H01M 50/531*  (2021.01)
  *H01M 4/02*    (2006.01)

(52) U.S. Cl.
  CPC ........... *H01M 4/64* (2013.01); *H01M 10/052* (2013.01); *H01M 50/105* (2021.01); *H01M 50/461* (2021.01); *H01M 50/463* (2021.01); *H01M 50/531* (2021.01); *H01M 2004/027* (2013.01); *H01M 2004/028* (2013.01)

(56) References Cited

U.S. PATENT DOCUMENTS

| | | | | |
|---|---|---|---|---|
| 2012/0058390 | A1* | 3/2012 | Obayashi | H01M 50/553 29/877 |
| 2013/0059183 | A1 | 3/2013 | Ahn | |
| 2016/0190641 | A1* | 6/2016 | Lee | C08F 212/30 429/188 |
| 2018/0083311 | A1* | 3/2018 | Kim | H01M 50/1243 |

FOREIGN PATENT DOCUMENTS

| | | | |
|---|---|---|---|
| JP | H05-041248 | A | 2/1993 |
| JP | H10-188937 | A | 7/1998 |
| JP | 2000-251866 | A | 9/2000 |
| JP | 2006-147392 | A | 6/2006 |
| JP | 2010-073339 | A | 4/2010 |
| JP | 6064879 | B2 | 1/2017 |
| JP | 2017-076478 | A | 4/2017 |
| KR | 10-1998-0073911 | A | 11/1998 |
| KR | 20-0289707 | Y1 | 9/2002 |
| KR | 10-2006-0118955 | A | 11/2006 |
| KR | 10-2007-0073169 | A | 7/2007 |
| KR | 10-2013-0102514 | A | 9/2013 |
| KR | 10-1539236 | B1 | 7/2015 |
| KR | 10-2016-0012591 | A | 2/2016 |
| KR | 10-2016-0095354 | * | 8/2016 |
| KR | 10-2016-0095354 | A | 8/2016 |
| KR | 10-1735157 | B1 | 5/2017 |
| KR | 10-1772418 | B1 | 8/2017 |
| WO | 2013/089104 | A1 | 6/2013 |
| WO | 2014/042424 | A1 | 3/2014 |
| WO | 2017/057762 | A1 | 4/2017 |

OTHER PUBLICATIONS

International Search Report (with partial translation) and Written Opinion dated Dec. 2, 2019, issued in corresponding International Patent Application No. PCT/KR2019/009814.

Extended European Search Report issued by the European Patent Office dated Apr. 8, 2021 in a corresponding European Patent Application No. 19849820.6.

Yanpeng et al., "Reviving Lithium-Metal Anodes for Next-Generation High-Energy Batteries," Advanced Materials, vol. 29, No. 29 (2017) p. 1700007.

Ahn et al., "The Impact of Cell Geometries and Battery Designs on Safety and Performance of Lithium Ion Polymer Batteries," The Electrochemical Society (2001) pp. 1-1, XP055790850, https://www.electrochem.org/dl/ma/203/pdfs/0106.pdf [retrieved on Mar. 29, 2021].

* cited by examiner

Lithium dendrite exposed portion

STACK-FOLDING TYPE ELECTRODE ASSEMBLY AND LITHIUM METAL BATTERY INCLUDING THE SAME

TECHNICAL FIELD

This application claims priority to and the benefit of Korean Patent Application No. 10-2018-0094526 filed in the Korean Intellectual Property Office on Aug. 13, 2018, and Korean Patent Application No. 10-2019-0094560 filed in the Korean Intellectual Property Office on Aug. 2, 2019, the entire contents of which are incorporated herein by reference.

The present invention relates to a stack-folding type of electrode assembly and a lithium metal battery including the same.

BACKGROUND ART

A lithium metal battery corresponds to a battery for applying a negative active material made of a lithium metal (Li-metal) or a lithium alloy (Li-alloy) material, and it may theoretically have very high energy capacity because of a characteristic of the negative active material, but lithium dendrites grow on a surface of a negative electrode according to repeated charging and discharging, and safety of the battery is degraded.

When the lithium metal battery is realized according to a generally known stack-folding scheme, a lithium dendrite and dead lithium (lithium that may no longer participate in charging and discharging) generated on the surface of the negative electrode during a charging and discharging process are exposed on an upper side and a lower side of an electrode assembly, and a fine short circuit or a complete short circuit inside the battery may be generated. A lifespan of the battery in which the short circuit is generated may not be further maintained in any form.

DISCLOSURE

Technical Problem

The present invention has been made in an effort to provide a stack-folding type of lithium metal battery for preventing a lithium dendrite and dead lithium produced on a surface of a negative electrode from being exposed in a charging and discharging process by attaching an insulation tape on an upper side and a lower side of a folding separation film.

Technical Solution

An exemplary embodiment of the present invention provides a stack-folding type of electrode assembly including: a plurality of unit cells including a lithium metal negative electrode, a positive electrode, and a separation film provided between the lithium metal negative electrode and the positive electrode; and a folding separation film continuously provided among unit cells neighboring each other.

However, the electrode assembly, differing from the generally known stack-folding type of electrode assembly, includes an insulation tape respectively attached to an upper side and a lower side of the folding separation film, and it has a configuration in which the insulation tape is exposed to the outside.

MODE FOR INVENTION

In the present specification, unless explicitly described to the contrary, the word "comprise" and variations such as "comprises" or "comprising" will be understood to imply the inclusion of stated elements, but not the exclusion of any other elements. The terms "approximately" and "substantially" used in the specification are used to refer to the same value as or a value close to a specific permissible error in manufacture and materials, and are also used to prevent an unscrupulous infringer from improperly using the disclosure where accurate or absolute values are mentioned to help understanding of the present specification. As used throughout the present specification, "step to" or "step of" does not mean "step for".

In the present specification, the term "combination of these" included in the expression of a Markush form means one or more mixtures or combinations selected from a group consisting of configuration components described in the Markush form representation, and it means to include one or more selected from the group consisting of the configuration components.

Exemplary embodiments of the present invention are now described in detail based on the above definitions. However, these are presented as examples, and the present invention is not limited thereto and is only defined by the scope of the claims to be described later.

Stack-Folding Type of Electrode Assembly

The electrode assembly according to an exemplary embodiment is based on a stack-folding type of electrode assembly including a plurality of unit cells respectively including: a lithium metal negative electrode; a positive electrode; and a separation film provided between the lithium metal negative electrode and the positive electrode, and including a folding separation film continuously provided among unit cells neighboring each other.

However, differing from the conventional stack-folding type of electrode assembly, the electrode assembly according to an exemplary embodiment includes insulation tapes attached to an upper side and a lower side of the folding separation film, and it has a structure in which the insulation tape is exposed outside.

Figure 1:
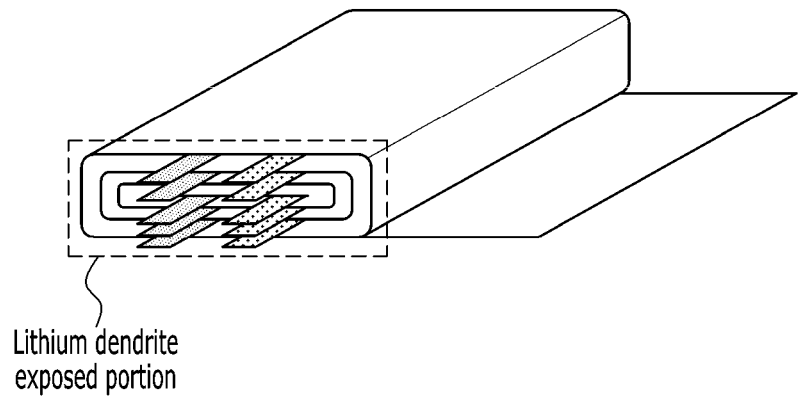
FIG. 1 shows a general stack-folding type of electrode assembly in a view from the top.

As shown in FIG. 1, when the lithium metal battery is realized according to a generally known stack-folding scheme, a lithium dendrite and dead lithium (lithium that may no longer participate in charging and discharging) generated on the surface of the negative electrode during a charging and discharging process may be exposed on an upper side and a lower side of the electrode assembly.

In detail, the lithium dendrite having grown on the surface of the negative electrode according to repeated charging and discharging grows or pushed out in a horizontal direction under a pressurization condition and is respectively exposed to the upper side and the lower side, that is, opened portions of the stack-folding type of electrode assembly, to contact a positive electrode or a positive current collector, thereby causing a fine short circuit or a complete short circuit in the battery. Accordingly, it is already pointed out that the lifespan of the battery in which a short circuit is generated may not be maintained in any form.

Figure 2A:
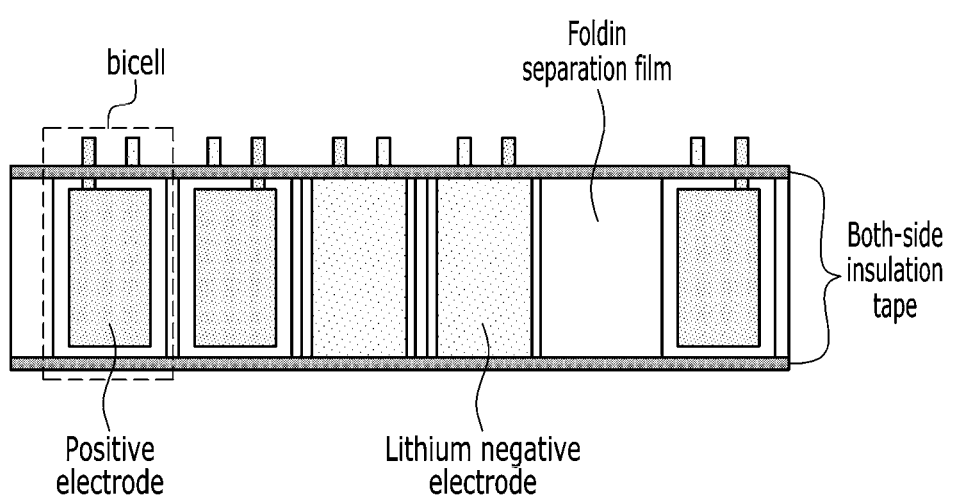
FIG. 2A shows respective attachment of an insulation tape to an upper side and a lower side of a folding separation film before a lithium metal battery according to an exemplary embodiment of the present invention is stack-folded.

On the contrary, in an exemplary embodiment of the present invention, as shown in FIG. 2A, the stack-folding type of electrode assembly is realized by attaching an insulation tape to the upper side and the lower side of the folding separation film, stacking a plurality of unit cells on the folding separation film, and folding the same.

In detail, the stack-folding type of electrode assembly according to an exemplary embodiment of the present invention is a stack-folding type of electrode assembly, and includes: a plurality of unit cells; and a folding separation film included in the unit cells and continuously provided among adjacent unit cells.

Particularly, the unit cells respectively include a lithium metal negative electrode and a positive electrode, an insulation tape is respectively attached to the upper side and lower side of the folding separation film, and the insulation tape respectively attached to the upper side and the lower side of the folding separation film is provided on the upper side and the lower side of the electrode assembly.

Figure 3:
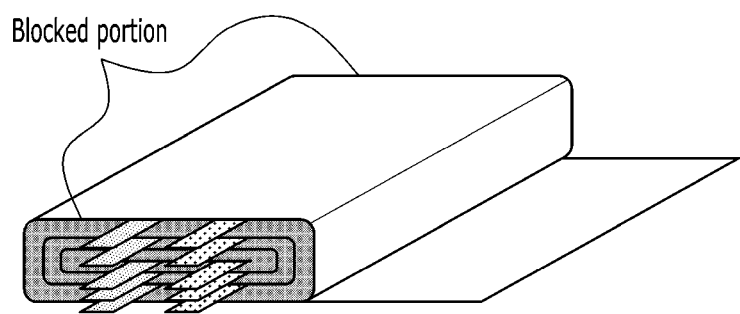
FIG. 3 shows one stack-folded lateral side after an insulation tape is respectively attached to an upper side and a lower side of a folding separation film according to FIG. 2A.

In other words, the insulation tapes respectively attached to the upper side and the lower side of the folding separation film are provided on the upper side and the lower side that are opened portions of the stack-folding type of electrode assembly as shown in FIG. 3.

The above-realized stack-folding type of electrode assembly may improve the lifespan of the battery by suppressing exposure of the lithium dendrite and the dead lithium produced on the surface of the negative electrode during a charging and discharging process.

The unit cells may be realized into a stack-folding type of electrode assembly by bonding to a first side of one side of the folding separation film, alternately, or to first and second sides thereof, bending the folding separation film, or winding the same.

In general, the unit cells are classified into mono-cells and bi-cells, and the mono-cells signify a structure in which electrodes on respective ends are stacked to form a positive electrode and a negative electrode, such as positive electrode/separation film/negative electrode or positive electrode/separation film/negative electrode/separation film/positive electrode/separation film/negative electrode. On the contrary, the bi-cells represent a structure in which electrodes on the respective ends are stacked to form a same electrode, and they are classified into a negative electrode type of bi-cell formed of positive electrode/separation film/negative electrode/separation film/positive electrode and a positive electrode type of bi-cell formed of negative electrode/separation film/positive electrode/separation film/negative electrode.

In the stack-folding type of electrode assembly according to an exemplary embodiment of the present invention, the unit cells may be bi-cells including two of the positive electrode or the lithium metal negative electrode as shown in FIG. 2A.

The respective realization of the unit cells into bi-cells may improve battery capacity compared to the mono-cell, and the exemplary embodiment is not limited thereto.

In addition, when the lithium dendrite grows on the surface of the lithium metal negative electrode while the battery including a stack-folding type of electrode assembly according to an exemplary embodiment is driven, it is needed to suppress protrusion outside the electrode assembly.

Figure 2B:
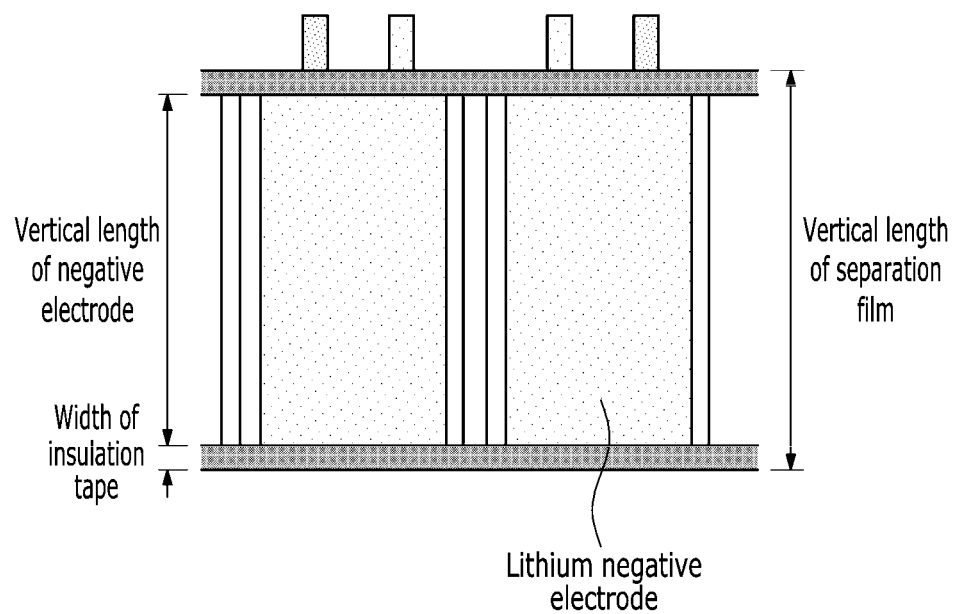
FIG. 2B shows an enlargement of a portion of FIG. 2A for describing a width of the insulation tape.

For this, a width of the insulation tape may be formed to be equivalent to a gap between a vertical length of the lithium metal negative electrode and a vertical length of the folding separation film. Here, a concept of the "width of the insulation tape" may be understood by referring to FIG. 2B that is an enlarged portion of part of FIG. 2A.

When the insulation tape is respectively attached to the upper side and the lower side of the folding separation film, and the width of the insulation tape is less than the gap between the vertical length of the lithium metal negative electrode and the vertical length of the folding separation film, the lithium dendrite may protrude outside the folding separation film, in a like manner of the case of not using the insulation tape, to thus sequentially generate drawbacks such as an internal short circuit in the lithium metal battery, degradation of discharge capacity, and reduction of the lifespan of battery.

On the contrary, when the insulation tape is respectively attached to the upper side and the lower side of the folding separation film, and the width of the insulation tape is controlled to be equal to the gap between the vertical length of the lithium metal negative electrode and the vertical length of the folding separation film, the lithium dendrite having grown on the surface of the lithium metal negative electrode may not protrude outside the electrode assembly, and the lifespan of the lithium metal battery may be improved compared to the former case.

For example, the width of the insulation tape may be 500 μm to 5 mm, and it may be modifiable according to respective thicknesses of the negative electrode and the separation film established in the design of cells.

Further, the thickness of the insulation tape may be determined within a range not influencing an increase of the thickness of the entire stack-folding type of electrode assembly. In detail, when the thickness of the insulation tape is equivalent to or less than the thickness of the negative electrode, it may not influence the increase of the thickness of the entire stack-folding type of electrode assembly.

In further detail, the thickness of the insulation tape may be 0.1 to 1 (i.e., the thickness of the insulation tape may be 0.1 to 1 times the thickness of the negative electrode) as a relative ratio to the thickness of the lithium metal negative electrode, and it may occupy a 3 to 5 thickness % of the entire thickness of the stack-folding type of electrode assembly.

In further detail, it may be 20 to 100 μm. The thickness within this range is sufficient for suppressing protruding of the dendrite, and it may be suitable for appropriately forming the thickness of the entire stack-folding type of electrode assembly after assembling the same. However, the exemplary embodiment is not limited thereto.

The insulation tape is generally used in the battery field, and it may include at least one of polyimide (PI), polypropylene (PP), and polyethylene terephthalate (PET). However, the exemplary embodiment is not limited thereto.

The configuration of the electrode assembly excluding the insulation tape may be appropriately selected depending on a content known to a person skilled in the art.

For example, it may include respective electrode tabs protruding from the lithium metal negative electrode and the positive electrode, and part or all of the protrusion may be exposed to the upper side of the electrode assembly.

In the exemplary embodiment, the positive electrode and the lithium metal negative electrode included in each unit cell are not specifically limited, and electrodes that are manufactured by a conventional method known to a person skilled in the art are usable.

The lithium metal negative electrode may include a negative current collector, and a lithium metal (Li-metal) thin film provided on the negative current collector. It may be generated by putting the lithium metal (Li-metal) thin film on the negative current collector including copper, gold, nickel, or a copper alloy, and pressurizing the same.

Further, the positive electrode may be manufactured by mixing a positive active material into an organic solvent such as a binder or a conductive material to manufacture a positive active material slurry, and applying the same to the positive current collector.

Here, aluminum and nickel are usable among unlimited examples of the positive current collector.

Further, unlimited examples of the positive active material include a lithium manganese oxide, a lithium cobalt oxide, a lithium nickel oxide, a lithium iron oxide, a mixture thereof, or a composite material thereof.

Lithium Metal Battery, Battery Module, Battery Pack, Etc.

In another exemplary embodiment of the present invention, a lithium metal battery in which a stack-folding type of electrode assembly is received in a case is provided.

The case may be a pouch type. Further, a liquid electrolyte may be impregnated in the folding separation film. For example, after the stack-folding type of electrode assembly according to the exemplary embodiment is received in the pouch-type case, the liquid electrolyte may be injected, and the lithium metal battery may thereby be provided.

The lithium metal battery may be used as a unit cell used as a power source of a small device, and it may also be used as a unit battery in a middle-to-large scale battery module including a plurality of battery cells. In addition, a battery pack including the battery module may be configured.

The liquid electrolyte may be used, as known to a person skilled in the art, by dissolving a lithium salt in a non-aqueous organic solvent. For example, negative ions of the lithium salt may be selected from among $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$;

In the case of the non-aqueous organic solvent, one of or a mixture of at least two of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran may be typically used. Particularly, the ethylene carbonate and the propylene carbonate that are cyclic carbonates from among the carbonate-based organic solvents are organic solvents with high viscosity, have a high dielectric property, and well dissociate the lithium salt in the electrolyte, so they may be preferably used, and when a linear carbonate with low viscosity and a low dielectric property such as a dimethyl carbonate or a diethyl carbonate is mixed with the cyclic carbonate at an appropriate ratio, and are then used, an electrolyte solution with high electrical conductivity may be produced and may more preferably be used.

Selectively, the liquid electrolyte may further include an additive such as an overcharging inhibitor included in a conventional liquid electrolyte.

An exemplary example according to the present invention, a comparative example, and an experimental example for estimating them will now be described. However, the example to be described hereinafter is an exemplary embodiment of the present invention, and the present invention is not limited to the example to be described.

Comparative Example 1: Preparation of a Porous Folding Separation Film Made of a Polyethylene Material to which No Insulation Tape is Attached A porous separation film (width*height*thickness: 461.5 mm*54 mm*12 um, porosity: 38%) made of a polyethylene material is prepared, and is used as a folding separation film of Comparative Example 1.

Comparative Example 2: A Stack-Folding Type of Electrode Assembly Including a Folding Separation Film of Comparative Example 1, and Manufacturing of a Lithium Metal Battery Including the Same A positive composite slurry is manufactured by mixing $LiNiCoMnO_2$ (a positive active material), Super-P (a conductive material), and PVdF (a binder) at a weight ratio of 96:2:2 in the solvent of NMP (N-methyl-2-pyrrolidone). The positive composite slurry is applied on respective sides or one side of an aluminum foil (thickness: 12 um) in the condition of 3 m/min by using a doctor blade. Here, the "applying of the positive composite slurry on respective sides or one side of an aluminum foil (thickness: 12 um)" signifies preparing a plurality of sheets of the aluminum foil, manufacturing a respective-sides positive electrode by "applying the positive composite slurry" to the "respective sides" of some of the aluminum foils", and manufacturing a one-side positive electrode by "applying the positive composite slurry" to the "one side" of the other aluminum foils."

A loading amount of the aluminum foil per sheet is set to be identical, that is, 0.478 g/25 $cm^2$.

The aluminum foil to which the positive composite slurry is applied is dried for 20 minutes in a vacuum oven at the temperature of 50° C., it is pressed for three seconds (s) at the temperature of 90° C., and in a pressure condition of 5.0 MPa by using a roll press, and it is obtained as the positive electrode.

In another way, a lithium foil (thickness: 20 um) is provided on respective sides of a copper foil (thickness: 8 um), it is pressed for three seconds (s) in the pressure condition of 5.0 MPa, and at a temperature of 90° C. by using a roll press, and it is obtained as the lithium metal negative electrode.

Seven positive electrode bi-cells (including two one-side positive electrode bi-cells among them) and four lithium metal negative electrode bi-cells are respectively assembled by using a porous separation film (width*height*thickness: 461.5 mm*54 mm*12 um, porosity: 38%) made of a same polyethylene material as the folding separation film of Comparative Example 1

The electrode assembly of Comparative Example 2 is obtained by sequentially folding the positive electrode bi-cell and the lithium metal negative electrode bi-cell as shown in FIG. 1 by using the folding separation film of Comparative Example 1.

The electrode assembly of Comparative Example 2 is installed in the pouch-type battery case, and an electrolyte in which 3.4-M lithium bis(fluorosulfonyl)imide (LiFSI) that is a high-concentration ether-based electrolyte is dissolved in 1,2-dimethoxyethane (DME) to complete the lithium metal battery of Comparative Example 2.

Example 1: Manufacturing of a Folding Separation Film in which an Insulation Tape is Respectively Attached to an Upper Side and a Lower Side A both-sides insulation tape (thickness: 30 um, width: 3 mm) made of a polyimide material is respectively attached to the upper side and the lower side of the porous separation film made of a same polyethylene material as Comparative Example 1.

Example 2: A Stack-Folding Type of Electrode Assembly Including a Folding Separation Film of Example 1, and Manufacturing of a Lithium Metal Battery Including the Same The positive electrode and the negative electrode are manufactured in a like manner of Comparative Example 2, and seven positive electrode bi-cells (including two one-side positive electrode bi-cells) and four lithium metal negative electrode bi-cells are respectively assembled.

However, the positive electrode bi-cell and the lithium metal negative electrode bi-cell are sequentially folded as shown in FIG. 1 by using the folding separation film of Example 1 as a folding separation film, and are obtained as the electrode assembly of Example 2.

Here, the width of the insulation tape corresponds to the gap between the vertical length of the lithium metal negative electrode and the vertical length of the folding separation film.

After that, the electrode assembly of Example 2 is installed in the pouch-type battery case by using the same method as Comparative Example 2, and the electrolyte is injected to complete the lithium metal battery of Example 2.

Experimental Example 1

The respective lithium metal batteries of Example 1 and Comparative Example 1 are charged and discharged for 180 cycles in the following condition.

Figure 4A:
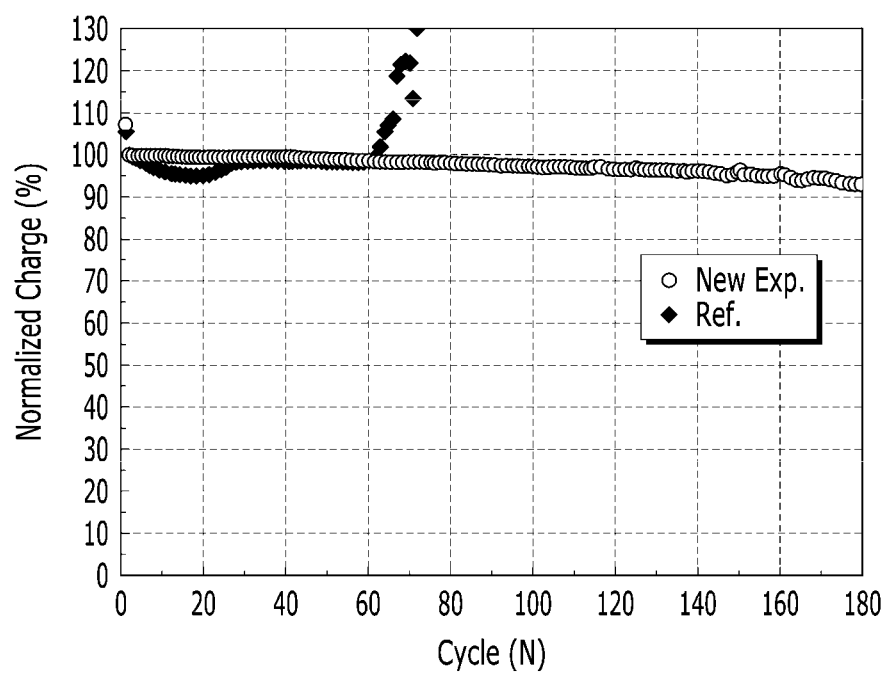
FIG. 4A to FIG. 4C show an electrochemical estimation result on respective lithium metal batteries according to an exemplary embodiment of the present invention and one comparative example (in detail, FIG. 4A shows a charging capacity estimation result, FIG. 4B shows a discharging capacity estimation result, FIG. 4C shows an OCV estimation result after a charge and discharge pause time (30 minutes), and in the respective drawings, Comparative Example 1 is denoted as 'Ref.', and Example 1 as 'New Exp.').
Figure 4B:
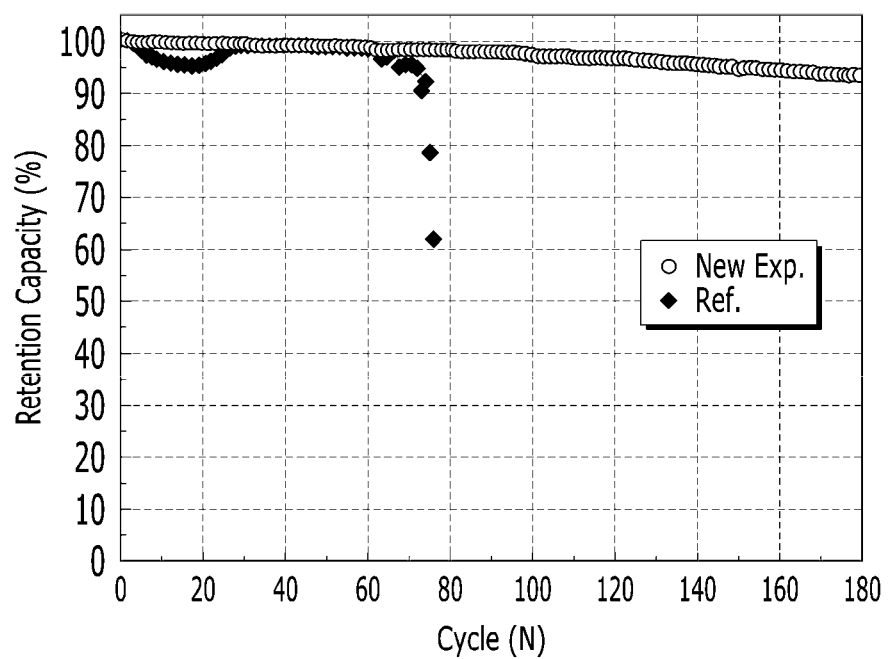
Figure 4C:
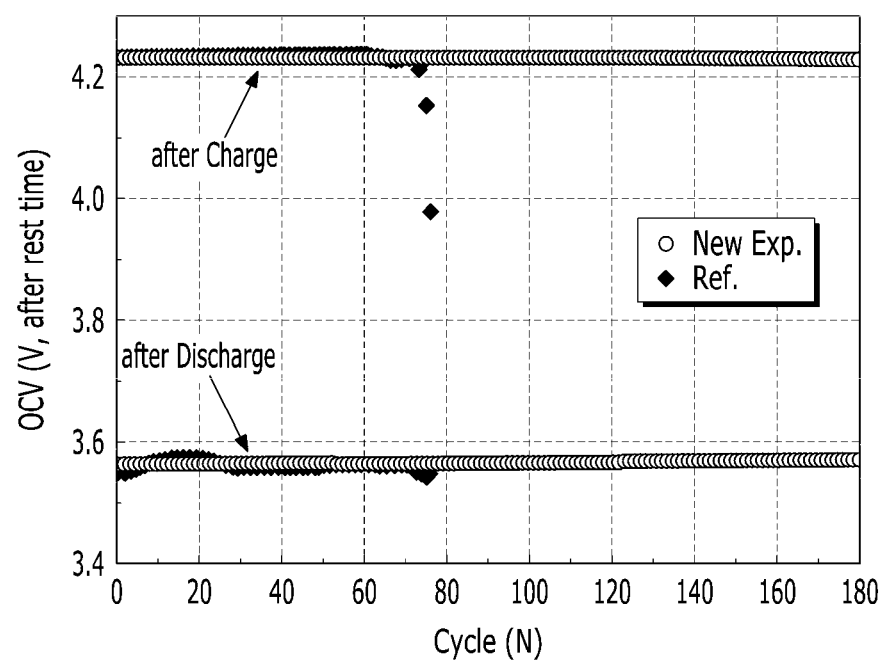

Charge: 0.1 C, CC/CV, 4.25 V, 1/20 C cut-off
Discharge: 0.5 C, CC, 3.0 V, cut-off After the charging and discharging cycle on the respective lithium metal batteries is finished, discharging capacity, charging capacity retention (100%*{charging capacity at the 180-th cycle}/{charging capacity at the first cycle}), and open circuit voltage (OCV) after charging and discharging are estimated and are shown in FIG. 4A to 4C.

In detail, FIG. 4A shows a charging capacity estimation result, FIG. 4B shows a discharging capacity estimation result, and FIG. 4C shows an OCV estimation result, and in the respective drawings, Comparative Example 1 is indicated as 'Ref.', and Example 1 as 'New Exp.'.

According to the estimation result, in the case of using a folding separation film to which no insulation tape is attached (Comparative Example 1), it is found that a fine inner short circuit is generated by interference caused by protrusion of the lithium dendrite after about 60 cycles to increase the charging capacity and abruptly reduce the discharging capacity (FIGS. 4A and 4B). Further, the phenomenon that the voltage after the charging and discharging pause time falls, which may be seen to be a ground of an internal short circuit, is found (FIG. 4C).

On the contrary, when the folding separation film in which an insulation tape is respectively attached to the upper side and the lower side is used (Example 1), no internal short circuit phenomenon was found in the lifespan performance graph, and capacity retention that is equal to or greater than 90% is found at about the 180-th cycle.

According to the estimation result, the insulation tape is respectively attached to the upper side and the lower side of the folding separation film, and a simple method for allowing the width of the insulation tape to be equal to the gap between the vertical length of the lithium metal negative electrode and the vertical length of the folding separation film is used, so the internal short circuit of the lithium metal battery is efficiently prevented, and it is proved that the lifespan of the lithium metal battery may be substantially improved compared to the case when the insulation tape is not applied.

In the present experimental example, the insulation tape made of a polyimide (PI) material is used for ease of description, and when it is replaced with an insulation tape made of a material of polypropylene (PP) and polyethylene terephthalate (PET) having the same insulation performance, performance of a similar level to Example 1 may be acquired.

INDUSTRIAL APPLICABILITY

According to the present invention, the lithium dendrite and the dead lithium generated on the surface of the negative electrode may not be exposed because of the insulation tapes respectively attached to the upper side and the lower side of the folding separation film in the charging and discharging process of the lithium metal battery realized as a stack-folding type, and as a result, the lifespan of the battery may be improved.

The invention claimed is:

1. A stack-folding type of electrode assembly comprising:
    a plurality of unit cells including a lithium metal negative electrode, a positive electrode, and a separation film provided between the lithium metal negative electrode and the positive electrode;
    a folding separation film continuously provided among the unit cells neighboring each other; and
    two insulation tapes, one attached to an entire upper side and another attached to an entire lower side of the folding separation film,
    wherein the insulation tapes are exposed to an outside at the upper side and the lower side, that is opened portions of the stack-folding type of electrode assembly.

2. The stack-folding type of electrode assembly of claim 1, wherein
    each of the unit cells is bi-cells and includes two of the positive electrode or the lithium metal negative electrode.

3. The stack-folding type of electrode assembly of claim 1, wherein
    a total width of the two insulation tapes is equivalent to a difference between a vertical length of the lithium metal negative electrode and a vertical length of the folding separation film.

4. The stack-folding type of electrode assembly of claim 1, wherein
a thickness ratio of each of the insulation tapes to the lithium metal negative electrode is 0.1 to 1.

5. The stack-folding type of electrode assembly of claim 1, wherein
a thickness of each of the insulation tapes is 20 to 100 μm.

6. The stack-folding type of electrode assembly of claim 1, wherein
the insulation tapes include at least one of a polyimide (PI), a polypropylene (PP), and a polyethylene terephthalate (PET).

7. The stack-folding type of electrode assembly of claim 1, wherein
respective electrode tabs are protruded from the lithium metal negative electrode and the positive electrode, and a portion or all of protrusions are exposed to an upper side of the electrode assembly.

8. The stack-folding type of electrode assembly of claim 1, wherein
the lithium metal negative electrode includes a negative current collector, and a lithium metal (Li-metal) thin film provided on the negative current collector.

9. The stack-folding type of electrode assembly of claim 1, wherein the insulation tapes include a polyimide (PI).

10. The stack-folding type of electrode assembly of claim 1, wherein the insulation tapes include a polypropylene (PP).

11. The stack-folding type of electrode assembly of claim 1, wherein the insulation tapes include a polyethylene terephthalate (PET).

12. The stack-folding type of electrode assembly of claim 1, wherein a thickness of each of the insulation tapes is 30 to 100 μm.

13. The stack-folding type of electrode assembly of claim 1, wherein the two insulation tapes are attached to the entire upper side and the entire lower side of the folding separation film before folding so that the a total length of each of the two insulation tapes is equivalent to a length of the folding separation film.

14. The stack-folding type of electrode assembly of claim 1, wherein at least one of the two insulation tapes prevents an exposure of lithium dendrite grown on a surface of the lithium metal negative electrode during a charging and discharging process.

15. The stack-folding type of electrode assembly of claim 1, wherein the two insulation tapes are disposed between a gap between a vertical length of the lithium metal negative electrode and a vertical length of the folding the separation film.

16. A lithium metal battery in which a stack-folding type of electrode assembly of claim 1 is included in a case.

17. The lithium metal battery of claim 16, wherein
the case is a pouch type.

* * * * *